United States Patent
Cudak et al.

(10) Patent No.: US 9,213,644 B2
(45) Date of Patent: Dec. 15, 2015

(54) ALLOCATING ENCLOSURE CACHE IN A COMPUTING SYSTEM

(71) Applicant: LENOVO ENTERPRISE SOLUTIONS (SINGAPORE) PTE. LTD., Singapore (SG)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 168 days.

(21) Appl. No.: 13/788,593

(22) Filed: Mar. 7, 2013

(65) Prior Publication Data

US 2014/0258631 A1    Sep. 11, 2014

(51) Int. Cl.
*G06F 12/02*    (2006.01)
*G06F 12/08*    (2006.01)

(52) U.S. Cl.
CPC .......... *G06F 12/084* (2013.01); *G06F 12/0895* (2013.01); *G06F 2212/222* (2013.01); *G06F 2212/314* (2013.01); *G06F 2212/601* (2013.01); *G06F 2212/604* (2013.01); *G06F 2212/6046* (2013.01)

(58) Field of Classification Search
CPC .............. G06F 12/084; G06F 12/0871; G06F 12/0888; G06F 12/123; G06F 12/08; G06F 12/0866; G06F 12/122; G06F 2212/6042; G06F 3/0683; G06F 12/0895; G06F 2212/222; G06F 2212/314; G06F 2212/601; G06F 2212/604; G06F 2212/6046; G06F 12/0811; G06F 12/0842; G06F 12/0864; G06F 9/3836; G06F 9/3855; G06F 9/50; G11C 7/10
See application file for complete search history.

(56) References Cited

U.S. PATENT DOCUMENTS

| | | | |
|---|---|---|---|
| 5,875,464 A | 2/1999 | Kirk | |
| 6,493,800 B1 | 12/2002 | Blumrich | |
| 6,748,487 B1* | 6/2004 | Takamoto et al. | 711/113 |
| 6,973,536 B1 | 12/2005 | Jacobs et al. | |
| 7,340,652 B2 | 3/2008 | Jarvis et al. | |
| 7,558,920 B2 | 7/2009 | Mattina et al. | |
| 2004/0078518 A1* | 4/2004 | Kuwata | 711/113 |
| 2007/0016716 A1* | 1/2007 | Nemoto et al. | 711/2 |
| 2007/0143546 A1 | 6/2007 | Narad | |
| 2012/0221768 A1 | 8/2012 | Bagal et al. | |
| 2012/0304171 A1* | 11/2012 | Joshi et al. | 718/1 |
| 2013/0166724 A1* | 6/2013 | Bairavasundaram et al. | 709/224 |

* cited by examiner

*Primary Examiner* — Hashem Farrokh
(74) *Attorney, Agent, or Firm* — Edward J. Lenart; Katherine S. Brown; Kennedy Lenart Spraggins LLP

(57) ABSTRACT

Allocating enclosure cache in a computing system that includes an enclosure and a plurality of enclosure attached servers, including: receiving, by the enclosure, memory access information from each of the plurality of enclosure attached servers; determining, by the enclosure in dependence upon the memory access information, an amount of enclosure cache to allocate as shared cache that can be accessed by two or more of the enclosure attached servers; and determining, by the enclosure in dependence upon the memory access information, an amount of enclosure cache to allocate to each enclosure attached server for exclusive use by the enclosure attached server.

13 Claims, 4 Drawing Sheets

ALLOCATING ENCLOSURE CACHE IN A COMPUTING SYSTEM

BACKGROUND OF THE INVENTION

1. Field of the Invention

The field of the invention is data processing, or, more specifically, methods, apparatus, and products for allocating enclosure cache in a computing system.

2. Description of Related Art

Modern computing systems include various types of computer memory, each of which has differing access times. In order to make use of quick access memory, many computing systems implement a cache which ideally contains the most frequently accessed data. In a cached environment, direct attached cache provides the best performance with respect to latency. Non-volatile memory can be used in this space for the cache and is less expensive than DRAM, but is still expensive enough so that over provisioning the direct attached cache to cover all possible workloads and all hotspot sizes is not economical.

SUMMARY OF THE INVENTION

Methods, apparatuses, and products for allocating enclosure cache in a computing system that includes an enclosure and a plurality of enclosure attached servers, including: receiving, by the enclosure, memory access information from each of the plurality of enclosure attached servers; determining, by the enclosure in dependence upon the memory access information, an amount of enclosure cache to allocate as shared cache that can be accessed by two or more of the enclosure attached servers; and determining, by the enclosure in dependence upon the memory access information, an amount of enclosure cache to allocate to each enclosure attached server for exclusive use by the enclosure attached server.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
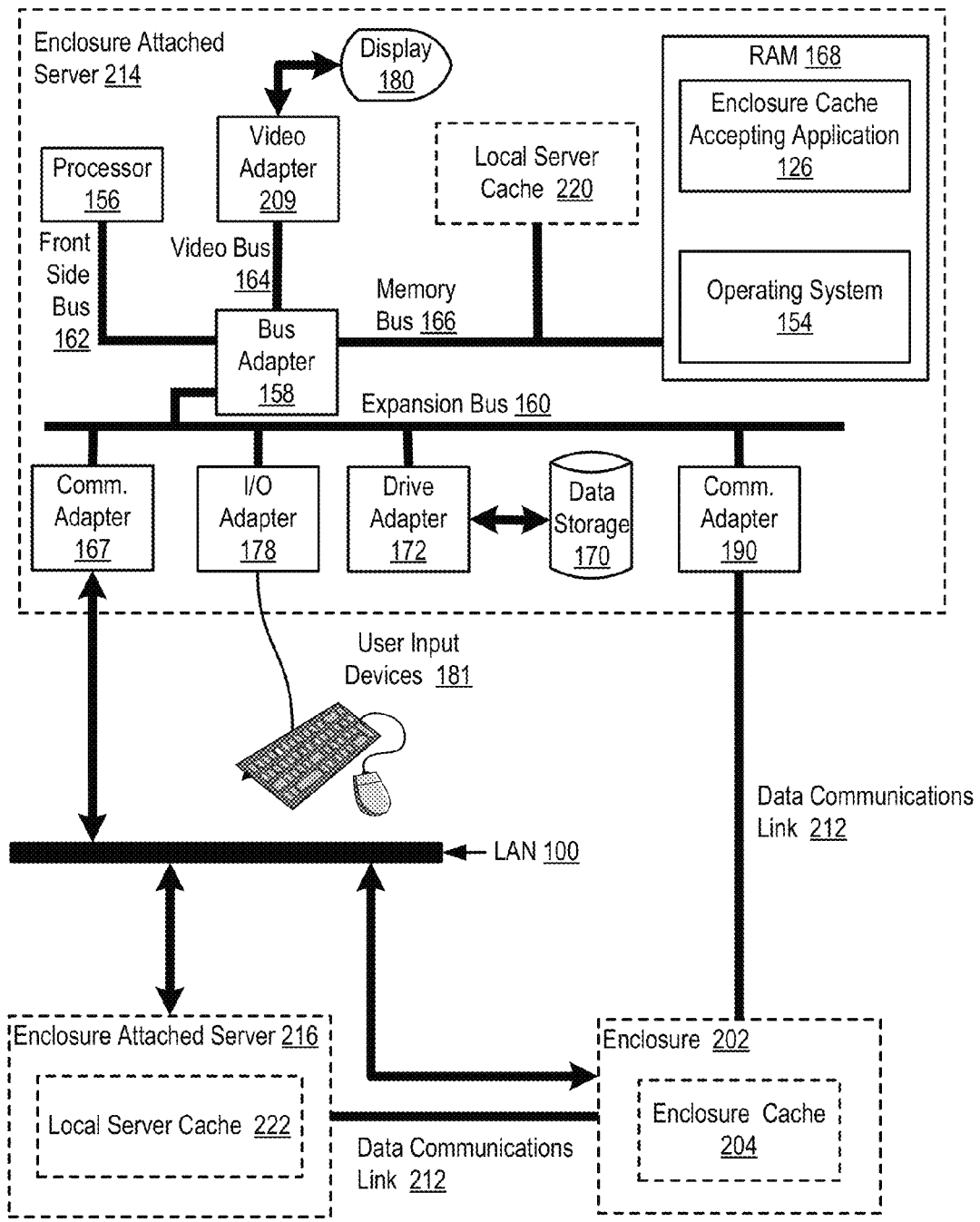
FIG. 1 sets forth a block diagram of automated computing machinery for allocating enclosure cache in a computing system that includes an enclosure and a plurality of enclosure attached servers according to embodiments of the present invention.

Example methods, apparatus, and products for allocating enclosure cache in a computing system that includes an enclosure and a plurality of enclosure attached servers in accordance with the present invention are described with reference to the accompanying drawings, beginning with FIG. 1. FIG. 1 sets forth a block diagram of automated computing machinery for allocating enclosure cache in a computing system that includes an enclosure and a plurality of enclosure attached servers according to embodiments of the present invention. The example of FIG. 1 includes an enclosure (202) that includes enclosure cache (204). An enclosure (202) is a structure in a blade center that includes memory resources for use by servers that are coupled for data communications with the enclosure (202). The enclosure (202) may include hard disk drives ('HDDs'), solid-state drives ('SSDs'), flash memory, and other forms of computer memory as will occur to those of skill in the art. The enclosure cache (204) of FIG. 1 may be embodied as relatively fast access memory such as flash memory. Readers will appreciate that the enclosure (202) may also include a network adapter for receiving data communications from other computers in the blade center, memory adapters for receiving memory access requests from other computers in the blade center, and so on.

FIG. 1 also includes a plurality of enclosure attached servers (214, 216), each of which includes local server cache (220, 222). The enclosure attached servers (214, 216) may be embodied, for example, as blade servers mounted in a blade center. The enclosure attached servers (214, 216) may include computer processors, computer memory, data communications adapters, and other computing hardware such that the enclosure attached servers (214, 216) operate as a fully functional computer that can run one or more services. The enclosure attached servers (214, 216) also include local server cache (220, 222). The local server cache (220, 222) may be embodied as relatively fast access memory, such as flash memory, that resides within an enclosure attached server (214, 216). In the example of FIG. 1, the enclosure cache (204) and the local server cache (220, 222) may be embodied as identical types of computer memory that are addressed identically and provide similar access times.

In the example of FIG. 1, the enclosure attached servers (214, 216) are coupled for data communications with the enclosure (202) over a data communications link (212). The data communications link (212) may be embodied, for example, as an Ethernet link, a Fibre Channel link, an InfiniBand link, or any other data communications link that enables each of the enclosure attached servers (214, 216) to communicate with the enclosure (202). Alternatively, the data communications link (212) may also be embodied as a computer bus such as a Small Computer System Interface ('SCSI') bus, Serial Attached SCSI (SAS') bus, Serial ATA ('SATA') bus, Universal Serial Bus ('USB'), or other computer bus that can be utilized by enclosure attached servers (214, 216) and the enclosure (202) to perform memory access operations in which the enclosure attached servers (214, 216) access memory contained in the enclosure (202).

In the example of FIG. 1, allocating enclosure cache (204) can include receiving, by the enclosure (202), memory access information from each of the plurality of enclosure attached servers (214, 216). Memory access information may be received by the enclosure (202) from each of the enclosure attached servers (214, 216) over the data communications link (212). Each enclosure attached servers (214, 216) may send the memory access information to the enclosure (202), for example, in response to a request for the information from the enclosure (202), periodically upon the expiration of a predetermined amount of time, periodically upon the occurrence of a predetermined number of memory access operations by each of the enclosure attached servers (214, 216), and so on. The memory access information may include information identifying the locations in memory that were accessed by a particular enclosure attached server (214, 216), information identifying the data in memory that was accessed by a particular enclosure attached server (214, 216), information identifying the block size of memory access operations that were initiated by a particular enclosure attached server (214, 216), and so on.

The memory access information may also include a cache hit rate for local server cache (220, 222) in each of the enclosure attached servers (214, 216). The cache hit rate for local server cache (220, 222) represents the frequency at which a memory access request initiated by an enclosure attached server (214, 216) results in the requested data being found in the local server cache (220, 222) of the enclosure attached server (214, 216). Consider an example in which a particular enclosure attached server (214) initiates 1000 commands to retrieve data from various locations in memory. In such an example, assume that the requested data is found in the local server cache (220) of the enclosure attached server (214) for 700 of the read requests, and that the remaining 300 read requests must be serviced by accessing a hard drive in the enclosure (202). In such an example, the cache hit rate for the local server cache (220) is 70%.

In the example of FIG. 1, allocating enclosure cache (204) can also include determining, in dependence upon the memory access information, an amount of enclosure cache (204) to allocate as shared cache that can be accessed by two or more of the enclosure attached servers (214, 216). In the example of FIG. 1, some portion of the enclosure cache (204) may be allocated as shared cache that can be accessed by two or more of the enclosure attached servers (214, 216). The amount of enclosure cache (204) to allocate as shared cache that can be accessed by two or more of the enclosure attached servers (214, 216) may be determined in dependence upon the memory access information provided by each of the enclosure attached servers (214, 216).

Consider an example in which the memory access information provided by each of the enclosure attached servers (214, 216) includes information identifying specific files in a file system that each enclosure attached servers (214, 216) has accessed. In such an example, when a particular file is accessed by more than one enclosure attached server (214, 216), the file may be loaded into shared cache such that each enclosure attached server (214, 216) that accesses the file does not need to retain a copy of the file in its own cache (220, 222). In such an example, determining an amount of enclosure cache (204) to allocate as shared cache that can be accessed by two or more of the enclosure attached servers (214, 216) in dependence upon the memory access information may be carried out by examining the memory access information and identifying files accessed by two or more of the enclosure attached servers (214, 216). The total size of the files that are accessed by two or more of the enclosure attached servers (214, 216) may be determined to be the amount of enclosure cache (204) to allocate as shared cache. In such an example, the enclosure (202) can subsequently load the files that are accessed by two or more of the enclosure attached servers (214, 216) into the shared cache and send instructions to each enclosure attached server (214, 216) that accessed the files to evict the files from local server cache (220, 222).

In the example of FIG. 1, allocating enclosure cache (204) can include determining, in dependence upon the memory access information, an amount of enclosure cache (204) to allocate to each enclosure attached server (214, 216) for exclusive use by the enclosure attached server (214, 216). In the example of FIG. 1, some amount of enclosure cache (204) may be allocated to each enclosure attached server (214, 216) for exclusive use by the enclosure attached server (214, 216). Each enclosure attached server (214, 216) may be allocated a different amount of enclosure cache (204) that is to be used exclusively by the enclosure attached server (214, 216). The amount of enclosure cache (204) that will be allocated to each enclosure attached server (214, 216) can be determined in dependence upon the memory access information that is provided by each enclosure attached server (214, 216).

Consider an example in which the memory access information that is provided by each enclosure attached server (214, 216) includes a cache hit rate for local server cache (220, 222) in each of the enclosure attached servers (214, 216). In such an example, all of the enclosure cache (204) that has not been allocated as shared cache can be divided up and allocated to a particular enclosure attached server (214, 216) for exclusive use by the enclosure attached server (214, 216). Determining the amount of enclosure cache (204) to allocate to each of the enclosure attached servers (214, 216) may be carried out by allocating enclosure cache (204) to each of the enclosure attached servers (214, 216) in a weighted manner to allocate a larger portion of the enclosure cache (204) to enclosure attached servers (214, 216) that have a low cache hit rate.

FIG. 1 also includes a more detailed view of one of the enclosure attached servers (214, 216). The enclosure attached server (214) of FIG. 1 includes at least one computer processor (156) or 'CPU' as well as random access memory (168) ('RAM') which is connected through a high speed memory bus (166) and bus adapter (158) to processor (156) and to other components of the enclosure attached server (214). Stored in RAM (168) is an enclosure cache accepting application (126), a module of computer program instructions useful for allocating enclosure cache (204). In the example of FIG. 1, the enclosure cache accepting application (126) includes computer program instructions for determining a hit rate for local server cache (220), accepting enclosure cache (204) from the enclosure (202), and utilizing the enclosure cache (204) as if it were local server cache (220).

Also stored in RAM (168) is an operating system (154). Operating systems useful in allocating enclosure cache (204) according to embodiments of the present invention include UNIX™, Linux™, Microsoft XP™, AIX™, IBM's i5/OS™, and others as will occur to those of skill in the art. The operating system (154) and the cache accepting application (126) in the example of FIG. 1 are shown in RAM (168), but many components of such software typically are stored in non-volatile memory also, such as, for example, on a disk drive (170).

The enclosure attached server (214) of FIG. 1 includes disk drive adapter (172) coupled through expansion bus (160) and bus adapter (158) to processor (156) and other components of the enclosure attached server (214). Disk drive adapter (172) connects non-volatile data storage to the enclosure attached server (214) in the form of disk drive (170). Disk drive adapters useful in computers for allocating enclosure cache (204) according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example enclosure attached server (214) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example enclosure attached server (214) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example enclosure attached server (214) of FIG. 1 includes a communications adapter (167) for data communications with other computers such as enclosure attached server (216) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for allocating enclosure cache (204) according to embodiments of the present invention include modems for wired dial-up communications, Ethernet (IEEE 802.3) adapters for wired data communications network communications, and 802.11 adapters for wireless data communications network communications.

Figure 2:
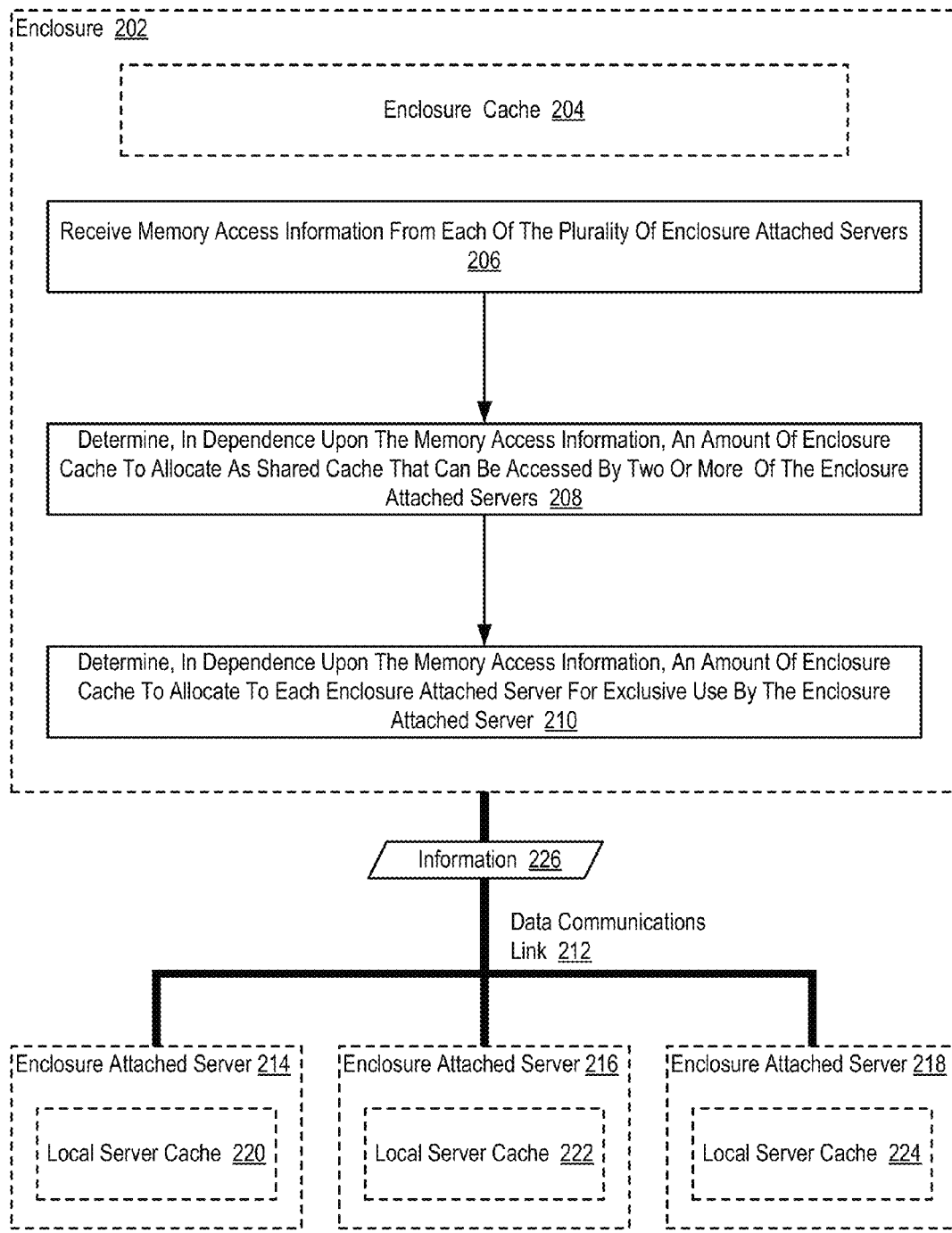
FIG. 2 sets forth a flow chart illustrating an example method for allocating enclosure cache in a computing system according to embodiments of the present invention.

For further explanation, FIG. 2 sets forth a flow chart illustrating an example method for allocating enclosure cache in a computing system according to embodiments of the present invention. In the example method of FIG. 2, the computing system includes an enclosure (202) that includes enclosure cache (204). In the example method of FIG. 2, an enclosure (202) is a structure in a blade center that includes memory resources for use by servers that are coupled for data communications with the enclosure (202). The enclosure (202) may include hard disk drives ('HDDs'), solid-state drives ('SSDs'), flash memory, and other forms of computer memory as will occur to those of skill in the art. The enclosure cache (204) of FIG. 2 may be embodied as relatively fast access memory such as flash memory. Readers will appreciate that the enclosure (202) may also include a network adapter for receiving data communications from other computers in the blade center, memory adapters for receiving memory access requests from other computers in the blade center, and so on.

The computing system of FIG. 2 also includes a plurality of enclosure attached servers (214, 216, 218), each of which includes local server cache (220, 222, 224). The enclosure attached servers (214, 216, 218) of FIG. 2 may be embodied, for example, as blade servers mounted in a blade center. The enclosure attached servers (214, 216, 218) of FIG. 2 may include computer processors, computer memory, data communications adapters, and other computing hardware such that the enclosure attached servers (214, 216, 218) operate as a fully functional computer that can run one or more services. The enclosure attached servers (214, 216, 218) of FIG. 2 also include local server cache (220, 222, 224). The local server cache (220, 222, 224) of FIG. 2 may be embodied as relatively fast access memory, such as flash memory, that resides within an enclosure attached server (214, 216, 218). In the example method of FIG. 2, the enclosure cache (204) and the local server cache (220, 222, 224) may be embodied as identical types of computer memory that are addressed identically and provide similar access times.

In the example method of FIG. 2, the enclosure attached servers (214, 216, 218) are coupled for data communications with the enclosure (202) over a data communications link (212). In the example method of FIG. 2, the data communications link (212) may be embodied, for example, as an Ethernet link, a Fibre Channel link, an InfiniBand link, or any other data communications link that enables each of the enclosure attached servers (214, 216, 218) to communicate with the enclosure (202). Alternatively, the data communications link (212) may also be embodied as a computer bus such as a SCSI bus, SAS bus, SATA bus, USB, or other computer bus that can be utilized by enclosure attached servers (214, 216, 218) and the enclosure (202) to perform memory access operations in which the enclosure attached servers (214, 216, 218) access memory contained in the enclosure (202).

The example method of FIG. 2 includes receiving (206), by the enclosure (202), memory access information (226) from each of the plurality of enclosure attached servers (214, 216, 218). In the example method of FIG. 2, memory access information (226) may be received (206) by the enclosure (202) from each of the enclosure attached servers (214, 216, 218) over the data communications link (212). Each enclosure attached servers (214, 216, 218) may send the memory access information (226) to the enclosure (202), for example, in response to a request for the information (226) from the enclosure (202), periodically upon the expiration of a predetermined amount of time, periodically upon the occurrence of a predetermined number of memory access operations by each of the enclosure attached servers (214, 216, 218), and so on. In the example method of FIG. 2, the memory access information (226) may include information identifying the locations in memory that were accessed by a particular enclosure attached server (214, 216, 218), information identifying the data in memory that was accessed by a particular enclosure attached server (214, 216, 218), information identifying the block size of memory access operations that were initiated by a particular enclosure attached server (214, 216, 218), and so on.

The memory access information (226) of FIG. 2 may also include a cache hit rate for local server cache (220, 222, 224) in each of the enclosure attached servers (214, 216, 218). In the example method of FIG. 2, the cache hit rate for local server cache (220, 222, 224) represents the frequency at which a memory access request initiated by an enclosure attached server (214, 216, 218) results in the requested data being found in the local server cache (220, 222, 224) of the enclosure attached server (214, 216, 218). Consider an example in which a particular enclosure attached server (214) initiates 1000 commands to retrieve data from various locations in memory. In such an example, assume that the requested data is found in the local server cache (220) of the enclosure attached server (214) for 700 of the read requests, and that the remaining 300 read requests must be serviced by accessing a hard drive in the enclosure (202). In such an example, the cache hit rate for the local server cache (220) is 70%.

The example method of FIG. 2 also includes determining (208), by the enclosure (202) in dependence upon the memory access information (226), an amount of enclosure cache (204) to allocate as shared cache that can be accessed by two or more of the enclosure attached servers (214, 216, 218). In the example method of FIG. 2, some portion of the enclosure cache (204) may be allocated as shared cache that can be accessed by two or more of the enclosure attached servers (214, 216, 218). The amount of enclosure cache (204) to allocate as shared cache that can be accessed by two or more of the enclosure attached servers (214, 216, 218) may be determined (208) in dependence upon the memory access information (226) provided by each of the enclosure attached servers (214, 216, 218).

Consider an example in which the memory access information (226) provided by each of the enclosure attached servers (214, 216, 218) includes information identifying specific files in a file system that each enclosure attached servers (214, 216, 218) has accessed. In such an example, when a particular file is accessed by more than one enclosure attached server (214, 216, 218), the file may be loaded into shared cache such that each enclosure attached server (214, 216, 218) that accesses the file does not need to retain a copy of the file in its own cache (220, 222, 224). In such an example, determining (208) an amount of enclosure cache (204) to allocate as shared cache that can be accessed by two or more of the enclosure attached servers (214, 216, 218) in dependence upon the memory access information (226) may be carried out by examining the memory access information (226) and identifying files accessed by two or more of the enclosure attached servers (214, 216, 218). The total size of the files that are accessed by two or more of the enclosure attached servers (214, 216, 218) may be determined (208) to be the amount of enclosure cache (204) to allocate as shared cache. In such an example, the enclosure (202) can subsequently load the files that are accessed by two or more of the enclosure attached servers (214, 216, 218) into the shared cache and send instructions to each enclosure attached server (214, 216, 218) that accessed the files to evict the files from local server cache (220, 222, 224).

The example method of FIG. 2 also includes determining (210), by the enclosure (202) in dependence upon the memory access information (226), an amount of enclosure cache (204) to allocate to each enclosure attached server (214, 216, 218) for exclusive use by the enclosure attached server (214, 216, 218). In the example method of FIG. 2, some amount of enclosure cache (204) may be allocated to each enclosure attached server (214, 216, 218) for exclusive use by the enclosure attached server (214, 216, 218). Each enclosure attached server (214, 216, 218) may be allocated a different amount of enclosure cache (204) that is to be used exclusively by the enclosure attached server (214, 216, 218). The amount of enclosure cache (204) that will be allocated to each enclosure attached server (214, 216, 218) can be determined (210) in dependence upon the memory access information (226) that is provided by each enclosure attached server (214, 216, 218).

Consider an example in which the memory access information (226) that is provided by each enclosure attached server (214, 216, 218) includes a cache hit rate for local server cache (220, 222, 224) in each of the enclosure attached servers (214, 216, 218). In such an example, all of the enclosure cache (204) that has not been allocated as shared cache can be divided up and allocated to a particular enclosure attached server (214, 216, 218) for exclusive use by the enclosure attached server (214, 216, 218). Determining (210) the amount of enclosure cache (204) to allocate to each of the enclosure attached servers (214, 216, 218) may be carried out by allocating enclosure cache (204) to each of the enclosure attached servers (214, 216, 218) in a weighted manner to allocate a larger portion of the enclosure cache (204) to enclosure attached servers (214, 216, 218) that have a low cache hit rate.

Consider an example in which the enclosure (202) had 150 GB of enclosure cache (204) that was not allocated as shared cache. In such an example, assume that enclosure attached server (214) had a local server cache (220) hit rate of 25%, enclosure attached server (216) had a local server cache (222) hit rate of 50%, and enclosure attached server (218) had a local server cache (224) hit rate of 75%. In such an example, the enclosure (202) could allocate 75 GB of enclosure cache (204) to enclosure attached server (214) for exclusive use by enclosure attached server (214), 50 GB of enclosure cache (204) to enclosure attached server (216) for exclusive use by enclosure attached server (216), and 25 GB of enclosure cache (204) to enclosure attached server (218) for exclusive use by enclosure attached server (218). In such an example, the amount of enclosure cache (204) that is allocated to each enclosure attached server (214, 216, 218) is directly proportional to the cache hit rate of each enclosure attached server (214, 216, 218). For example, enclosure attached server (214) receives twice as much enclosure cache as enclosure attached server (216) because enclosure attached server (216) has a cache hit rate that is twice as high as enclosure attached server (214).

Figure 3:
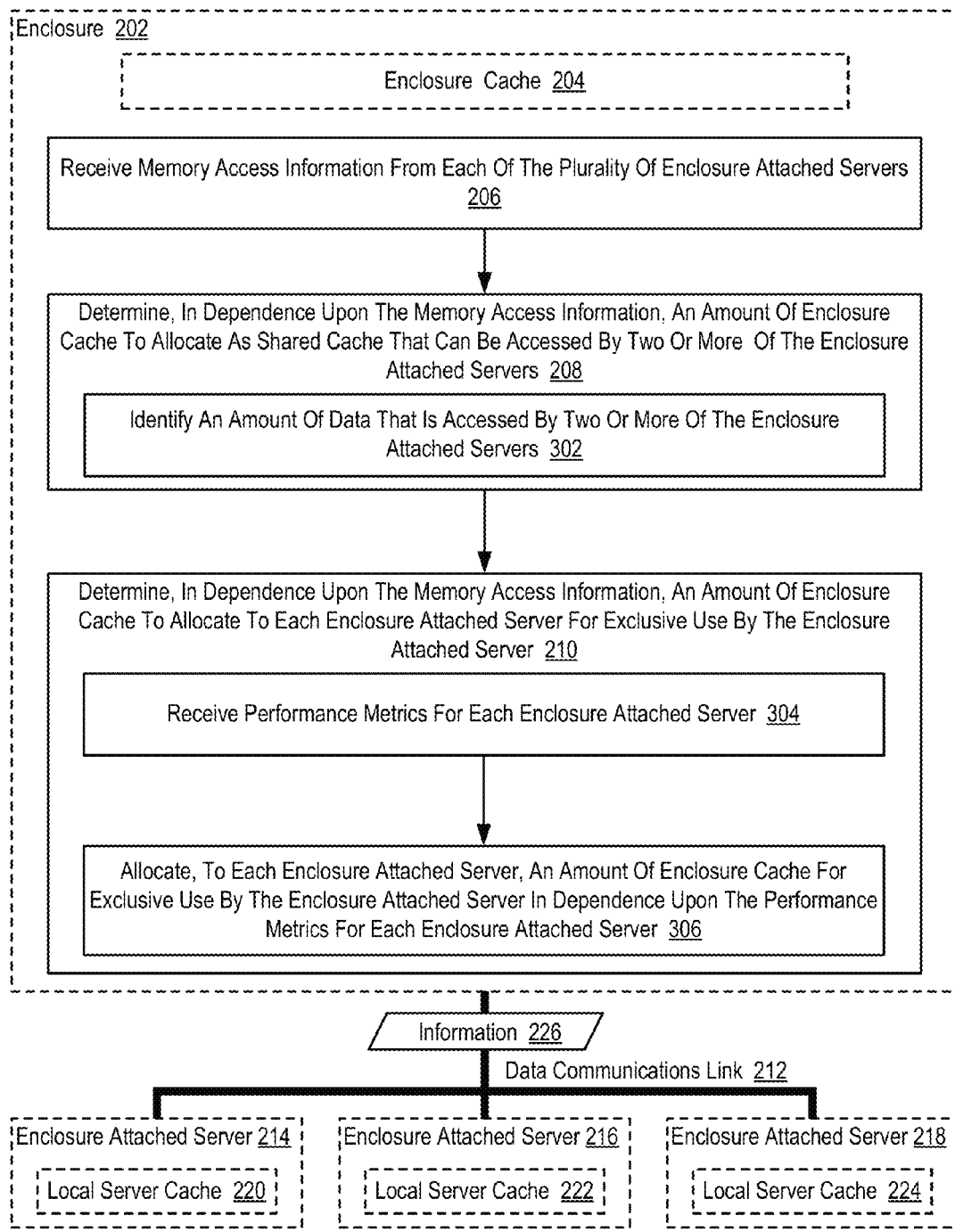
FIG. 3 sets forth a flow chart illustrating an additional example method for allocating enclosure cache in a computing system according to embodiments of the present invention.

For further explanation, FIG. 3 sets forth an additional flow chart illustrating an example method for allocating enclosure cache in a computing system according to embodiments of the present invention. The example method of FIG. 3 is similar to the example method of FIG. 2 as it also includes receiving (206) memory access information (226) from each of the plurality of enclosure attached servers (214, 216, 218), determining (208) an amount of enclosure cache (204) to allocate as shared cache that can be accessed by two or more of the enclosure attached servers (214, 216, 218), and determining (210) an amount of enclosure cache (204) to allocate to each enclosure attached server (214, 216, 218) for exclusive use by the enclosure attached server (214, 216, 218).

In the example method of FIG. 3, determining (208) an amount of enclosure cache (204) to allocate as shared cache that can be accessed by two or more of the enclosure attached servers (214, 216, 218) further comprises identifying (302), by the enclosure (202), an amount of data that is accessed by two or more of the enclosure attached servers (214, 216, 218). In the example method of FIG. 3, identifying (302) an amount of data that is accessed by two or more of the enclosure attached servers (214, 216, 218) may be carried out, for example, by examining the memory access information (226) received (206) from each of the enclosure attached servers (214, 216, 218). For example, if the memory access information (226) identified specific files in a file system that each enclosure attached servers (214, 216, 218) has accessed, identifying (302) an amount of data that is accessed by two or more of the enclosure attached servers (214, 216, 218) may be carried out by summing the size of each file that is accessed by two or more of the enclosure attached servers (214, 216, 218). In such an example, the amount of data that is accessed by two or more of the enclosure attached servers (214, 216, 218) may be used to determine (208) how much of the enclosure cache (204) should be allocated as shared cache that can be accessed by two or more of the enclosure attached servers (214, 216, 218).

In the example method of FIG. 3, determining (210) an amount of enclosure cache (204) to allocate to each enclosure attached server (214, 216, 218) for exclusive use by the enclosure attached server (214, 216, 218) can include receiving (304), by the enclosure (202), performance metrics for each enclosure attached server (214, 216, 218). In the example method of FIG. 3, performance metrics for each enclosure attached server (214, 216, 218) may be included in the memory access information (226) that is received (206) from each of the enclosure attached servers (214, 216, 218). Performance metrics can include, for example, the cache hit rate for local server cache (220, 222, 224) on each enclosure attached server (214, 216, 218), an average number of Input/Output Operations Per Second ('IOPs'), information identifying the percentage of memory accesses that are repeated during a predetermined number of memory accesses, and so on.

In the example method of FIG. 3, determining (210) an amount of enclosure cache (204) to allocate to each enclosure attached server (214, 216, 218) for exclusive use by the enclosure attached server (214, 216, 218) can also include allocating (306), by the enclosure (202) to each enclosure attached server (214, 216, 218), an amount of enclosure cache (204) for exclusive use by the enclosure attached server (214, 216, 218) in dependence upon the performance metrics for each enclosure attached server (214, 216, 218). Consider an example in which the performance metrics for each enclosure attached server (214, 216, 218) includes information identifying, for each enclosure attached server (214, 216, 218), the percentage of memory accesses that are repeated during a predetermined number of memory accesses.

In such an example, an enclosure attached server (214, 216, 218) that services a high percentage of repeated memory accesses may receive more benefit from additional cache that an enclosure attached server (214, 216, 218) that services a low percentage repetitive accesses. That is, an enclosure attached server (214, 216, 218) that repeatedly accesses the same portions of memory may benefit greatly from additional cache as the portions of memory that are accessed repeatedly can remain in cache for quick access. In contrast, an enclosure attached server (214, 216, 218) that rarely accesses the same portions of memory may not benefit much from additional cache as the each access of memory is unlikely to result in a cache hit given that most memory accesses are directed to a portion of memory that has not been previously accessed. In such an example, enclosure cache (204) can be allocated to each of the enclosure attached servers (214, 216, 218) in a weighted manner. For example, if enclosure attached server (214) that serviced twice as many repeated memory accesses as enclosure attached server (216), enclosure attached server (214) could receive twice as much enclosure cache (204) as enclosure attached server (216).

Figure 4:
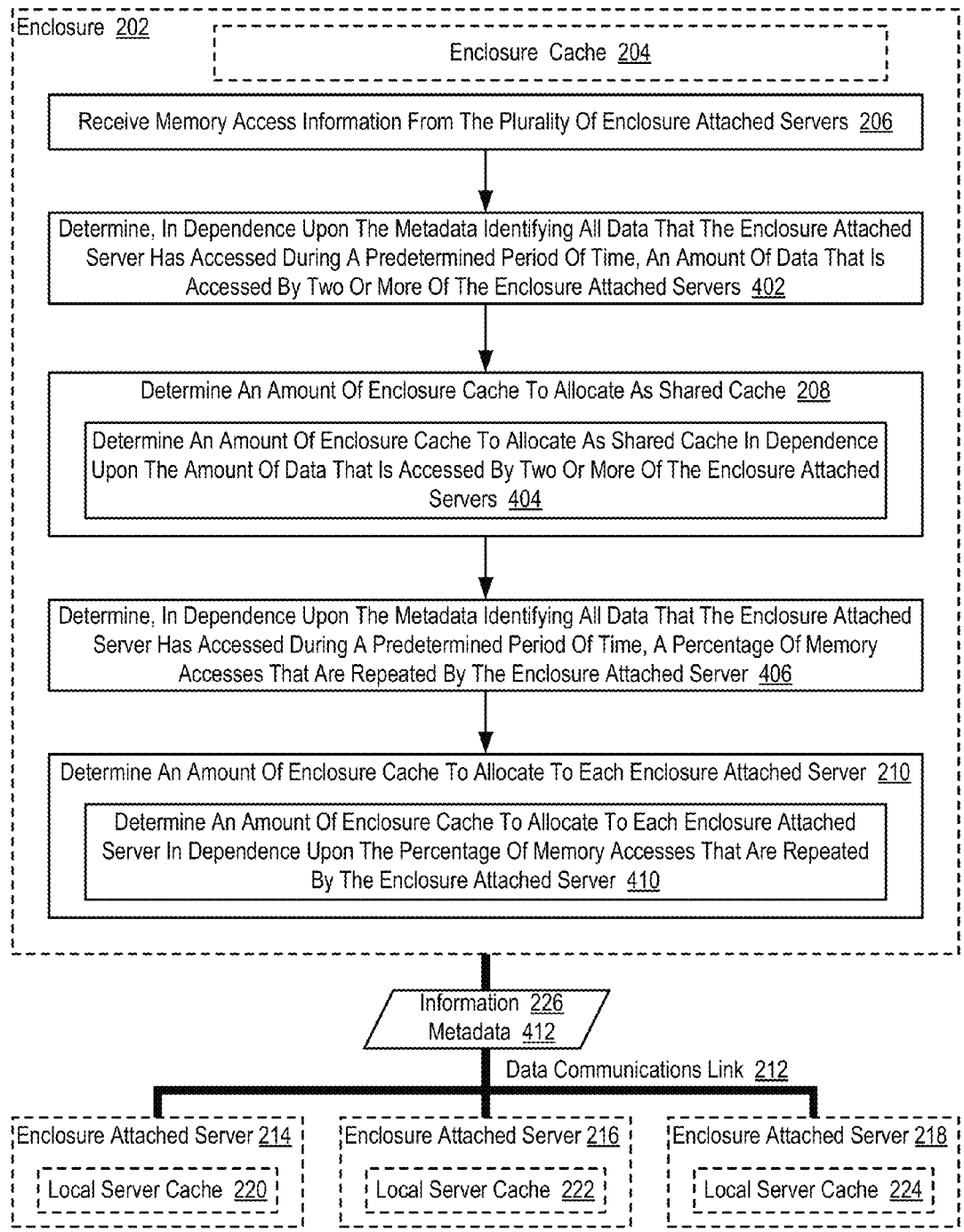
FIG. 4 sets forth a flow chart illustrating an additional example method for allocating enclosure cache in a computing system according to embodiments of the present invention.

For further explanation, FIG. 4 sets forth an additional flow chart illustrating an example method for allocating enclosure cache in a computing system according to embodiments of the present invention. The example method of FIG. 4 is similar to the example method of FIG. 2 as it also includes receiving (206) memory access information (226) from each of the plurality of enclosure attached servers (214, 216, 218), determining (208) an amount of enclosure cache (204) to allocate as shared cache that can be accessed by two or more of the enclosure attached servers (214, 216, 218), and determining (210) an amount of enclosure cache (204) to allocate to each enclosure attached server (214, 216, 218) for exclusive use by the enclosure attached server (214, 216, 218).

In the example method of FIG. 4, the memory access information (226) from each of the plurality of enclosure attached servers (214, 216, 218) includes metadata (412) identifying all data that the enclosure attached server (214, 216, 218) has accessed during a predetermined period of time. In the example method of FIG. 4, the metadata (412) identifying all data that the enclosure attached server (214, 216, 218) has accessed during a predetermined period of time can include, for example, the memory address of each memory access, a file name associated with each memory access, and so on. In the example method of FIG. 4, the metadata (412) identifying all data that the enclosure attached server (214, 216, 218) has accessed during a predetermined period of time may be received by the enclosure (202) from each of the plurality of enclosure attached servers (214, 216, 218) over the data communications link (212).

The example method of FIG. 4 also includes determining (402), by the enclosure (202) in dependence upon the metadata (412) identifying all data that the enclosure attached server (214, 216, 218) has accessed during a predetermined period of time, an amount of data that is accessed by two or more of the enclosure attached servers (214, 216, 218). In the example method of FIG. 4, determining (402) an amount of data that is accessed by two or more of the enclosure attached servers (214, 216, 218) may be carried out by examining the metadata (412) from each enclosure attached server (214, 216, 218). For example, metadata from a first enclosure attached server (214) can be compared to metadata from a second enclosure attached server (216) to identify memory addresses, files, and other data that is accessed by both enclosure attached servers (214, 216). The size of each file that is accessed by both enclosure attached servers (214, 216), the size of each block of data accessed by both enclosure attached servers (214, 216), and similar information can be used to determine the amount of data that is accessed by two or more of the enclosure attached servers (214, 216). In such an example, similar comparisons can be made iteratively to compare the metadata provided by all of the enclosure attached servers (214, 216, 218).

In the example method of FIG. 4, determining (208) an amount of enclosure cache (204) to allocate as shared cache that can be accessed by two or more of the enclosure attached servers (214, 216, 218) can include determining (404) an amount of enclosure cache (204) to allocate as shared cache in dependence upon the amount of data that is accessed by two or more of the enclosure attached servers (214, 216, 218). In the example method of FIG. 4, the data that is accessed by two or more of the enclosure attached servers (214, 216, 218) can be stored in shared cache, such that identical data does not need to be stored in multiple locations in the computing system by storing a copy of the data accessed by two or more of the enclosure attached servers (214, 216, 218) in the dedicated cache of each of the enclosure attached servers (214, 216, 218). In such a way, the amount of enclosure cache (204) to allocate as shared cache can be sized so as to hold all data that is accessed by two or more of the enclosure attached servers (214, 216, 218).

The example method of FIG. 4 also includes determining (406), by the enclosure (202) in dependence upon the metadata (412) identifying all data that the enclosure attached server (214, 216, 218) has accessed during a predetermined period of time, a percentage of memory accesses that are repeated by the enclosure attached server (214, 216, 218). In the example method of FIG. 4, determining (406) a percentage of memory accesses that are repeated by the enclosure attached server (214, 216, 218) may be carried out, for example, by examining the metadata (412) from each enclosure attached server (214, 216, 218). For example, the enclosure (202) may examine the metadata (412) provided by a first enclosure attached server (214) to identify memory addresses, file names, or other information identifying data that was accessed by the first enclosure attached server (214). The enclosure (202) may compare the memory address, file name, or other information identifying data that was accessed to the memory address, file name, or other information identifying data that was previously accessed to identify repeated accesses of the same the memory address, file name, and so on. In such an example, the percentage of memory accesses that are repeated by a particular enclosure attached server (214) can be determined by dividing the number of repeated accesses by the number of total accesses.

In the example method of FIG. 4, determining (210) an amount of enclosure cache (204) to allocate to each enclosure attached server (214, 216, 218) includes determining (410) an amount of enclosure cache (204) to allocate to each enclosure attached server (214, 216, 218) in dependence upon the percentage of memory accesses that are repeated by the enclosure attached server (214, 216, 218). In the example method of FIG. 4, an enclosure attached server (214) that services a high percentage of repeated memory accesses may receive more benefit from additional cache that an enclosure attached server (214) that services a low percentage repetitive accesses. That is, an enclosure attached server (214) that repeatedly accesses the same portions of memory may benefit greatly from additional cache as the portions of memory that are accessed repeatedly can remain in cache for quick access. In contrast, an enclosure attached server (216) that rarely accesses the same portions of memory may not benefit much from additional cache as the each access of memory is unlikely to result in a cache hit given that most memory accesses are directed to a portion of memory that has not been previously accessed. In such an example, enclosure cache (204) can be allocated to each of the enclosure attached servers (214, 216, 218) in a weighted manner. For example, if enclosure attached server (214) that serviced twice as many repeated memory accesses as enclosure attached server (216), enclosure attached server (214) could receive twice as much enclosure cache (204) as enclosure attached server (216).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus comprising a computing device, a computer processor, a computer memory operatively coupled to the computer processor, the computer memory having disposed within it computer program instructions that, when executed by the computer processor, cause the apparatus to carry out the steps of:
    receiving memory access information from each of a plurality of servers that are attached to a cache;
    determining, in dependence upon the memory access information, an amount of the cache to allocate as shared cache that can be accessed by two or more of the servers, wherein determining the amount of the cache to allocate as shared cache comprises identifying, based on the memory access information, files in the cache accessed by two or more of the plurality of servers;
    determining, in dependence upon the memory access information, an amount of the cache to allocate to each server for exclusive use by the server; and
    based on the determinations, allocating a first portion as shared cache and a second portion for exclusive use by each server.

2. The apparatus of claim 1 wherein determining an amount of the cache to allocate as shared cache further comprises identifying an amount of data that is accessed by two or more of the servers.

3. The apparatus of claim 1 wherein determining, in dependence upon the memory access information, an amount of the cache to allocate to each server for exclusive use by the server further comprises:
    receiving performance metrics for each server; and
    allocating, to each server, an amount of the cache for exclusive use by the server in dependence upon the performance metrics for each server.

4. The apparatus of claim 3 wherein performance metrics for each server includes a local server cache hit rate.

5. The apparatus of claim 1 wherein the memory access information from each of the plurality of servers includes metadata identifying all data that the server has accessed during a predetermined period of time.

6. The apparatus of claim 5 further comprising computer program instructions that, when executed by the computer processor, cause the apparatus to carry out the step of determining, in dependence upon the metadata identifying all data that the server has accessed during a predetermined period of time, an amount of data that is accessed by two or more of the servers; and
    wherein determining an amount of the cache to allocate as shared cache that can be accessed by two or more of the servers includes determining an amount of the cache to allocate as shared cache in dependence upon the amount of data that is accessed by two or more of the servers.

7. The apparatus of claim 5 further comprising computer program instructions that, when executed by the computer processor, cause the apparatus to carry out the step of determining, in dependence upon the metadata identifying all data that the server has accessed during a predetermined period of time, a percentage of memory accesses that are repeated by the server; and
    wherein determining an amount of the cache to allocate to each server includes determining an amount of the cache to allocate to each server in dependence upon the percentage of memory accesses that are repeated by the server.

8. A computer program product disposed upon a non-transitory computer readable storage medium, the computer program product comprising computer program instructions that, when executed, cause a computer to carry out the steps of:
    receiving memory access information from each of a plurality of servers that are attached to a cache;
    determining, in dependence upon the memory access information, an amount of the cache to allocate as shared cache that can be accessed by two or more of the servers, wherein determining the amount of the cache to allocate as shared cache comprises identifying, based on the memory access information, files in the cache accessed by two or more of the plurality of servers;
    determining, in dependence upon the memory access information, an amount of the cache to allocate to each server for exclusive use by the server, and
    based on the determinations, allocating a first portion as shared cache and a second portion for exclusive use by each server.

9. The computer program product of claim 8 wherein determining an amount of the cache to allocate as shared cache further comprises identifying an amount of data that is accessed by two or more of the servers.

10. The computer program product of claim 8 wherein determining, in dependence upon the memory access information, an amount of the cache to allocate to each server for exclusive use by the server further comprises:
    receiving performance metrics for each server; and
    allocating, to each server, an amount of the cache for exclusive use by the server in dependence upon the performance metrics for each server.

11. The computer program product of claim 8 wherein the memory access information from each of the plurality of servers includes metadata identifying all data that the server has accessed during a predetermined period of time.

12. The computer program product of claim 11 further comprising computer program instructions that, when executed, cause the computer to carry out the step of determining, in dependence upon the metadata identifying all data that the server has accessed during a predetermined period of time, an amount of data that is accessed by two or more of the servers; and
    wherein determining an amount of the cache to allocate as shared cache that can be accessed by two or more of the servers includes determining an amount of the cache to allocate as shared cache in dependence upon the amount of data that is accessed by two or more of the servers.

13. The computer program product of claim 11 further comprising computer program instructions that, when executed, cause the computer to carry out the step determining, in dependence upon the metadata identifying all data that the server has accessed during a predetermined period of time, a percentage of memory accesses that are repeated by the server; and wherein determining an amount of the cache to allocate to each server includes determining an amount of the cache to allocate to each server in dependence upon the percentage of memory accesses that are repeated by the server.

* * * * *